(12) United States Patent
Shmunk et al.

(10) Patent No.: US 10,199,043 B2
(45) Date of Patent: Feb. 5, 2019

(54) SCALABLE CODE EXCITED LINEAR PREDICTION BITSTREAM REPACKED FROM A HIGHER TO A LOWER BITRATE BY DISCARDING INSIGNIFICANT FRAME DATA

(75) Inventors: Dmitry V. Shmunk, Novosibirsk (RU); Dmitry Rusanov, Novosibirsk (RU)

(73) Assignee: DTS, Inc., Calabasas, CA (US)

(*) Notice: Subject to any disclaimer, the term of this patent is extended or adjusted under 35 U.S.C. 154(b) by 222 days.

(21) Appl. No.: 13/606,918

(22) Filed: Sep. 7, 2012

(65) Prior Publication Data

US 2014/0074460 A1 Mar. 13, 2014

(51) Int. Cl.
| | |
|---|---|
| *G10L 19/12* | (2013.01) |
| *H04L 29/06* | (2006.01) |
| *G10L 19/008* | (2013.01) |
| *G10L 19/24* | (2013.01) |
| *G10L 19/038* | (2013.01) |

(52) U.S. Cl.
CPC ............ *G10L 19/008* (2013.01); *G10L 19/12* (2013.01); *G10L 19/24* (2013.01); *G10L 19/038* (2013.01); *H04L 29/06* (2013.01)

(58) Field of Classification Search
CPC ....... G10L 19/12; G10L 19/008; G10L 19/24; H04L 29/06
USPC .................................................. 704/500, 200
See application file for complete search history.

(56) References Cited

U.S. PATENT DOCUMENTS

| | | | |
|---|---|---|---|
| 6,122,618 A * | 9/2000 | Park ................... G10L 19/005 | 375/E7.184 |
| 7,333,929 B1 * | 2/2008 | Chmounk ............... G10L 19/24 | 704/200 |
| 7,516,230 B2 * | 4/2009 | Sperschneider et al. ..... 709/231 | |
| 7,536,302 B2 * | 5/2009 | Chen .................. G10L 19/0208 | 200/500 |
| 7,930,184 B2 * | 4/2011 | Fejzo ............................. 704/500 | |
| 2008/0294429 A1 * | 11/2008 | Su et al. ...................... 704/222 | |

* cited by examiner

*Primary Examiner* — Farzad Kazeminezhad
(74) *Attorney, Agent, or Firm* — Craig S. Fischer

(57) ABSTRACT

The present invention provides for methods and apparatuses for processing audio data. In one embodiment, there is provided a method for achieving bitstream scalability in a multi-channel audio encoder, said method comprising receiving audio input data; organizing said input data by a Code Excited Linear Predictor (CELP) processing module for further encoding by arranging said data according to significance of data, where more significant data is placed ahead of less significant data; and providing a scalable output bitstream; a higher bitrate bitstream is scaled to lower bitrate by discarding less significant data from frame ends. The organized CELP data comprises of a first part and a second part. The first part comprises a frame header, sub frame parameters and innovation vector quantization data from the first frame from all channels. The innovation vector quantization data from the first frames from all channels is arranged according to channel number.

8 Claims, 8 Drawing Sheets

SCALABLE CODE EXCITED LINEAR PREDICTION BITSTREAM REPACKED FROM A HIGHER TO A LOWER BITRATE BY DISCARDING INSIGNIFICANT FRAME DATA

TECHNICAL FIELD

The embodiments herein relate to audio encoding mechanisms and, more particularly, to scalable bitstreams in audio encoding systems.

BACKGROUND

With the growth of communication networks across the world and with increasing numbers of users, it has become increasingly important to manage bit rates of data transferred across networks. Generally, the transmission of high bit rate data across communication networks consumes significant network bandwidth. Further, with increased data sizes, data storage and efficiency has become an important strategic issue. This is one area where data compression and coding techniques play a significant role. Data compression techniques, which generally include data compression algorithms, help to compress data. By compressing data, it becomes easier to transmit across networks as the compressed data consumes less bandwidth. Further, by using data compression, more data can be stored in limited memory space.

Audio compression is one example of data compression. Audio compression compresses digital audio signals containing speech and finds application in the fields of mobile telephony and voice over IP (VoIP). Encoding techniques for compressing speech signals or audio signals in low bit rates are important to utilize mobile communication system resources effectively. There are speech signal encoding schemes such as G726 and G729 standardized in ITU-T (International Telecommunication Union Telecommunication Standardization Sector). These schemes are targeted for narrowband signals (between 300 Hz and 3.4 kHz), and enable high quality speech signal encoding in bit rates of 8 to 32 kbits/s.

A major disadvantage of existing audio coding systems is that they fail to ensure audio quality when compressing speech. When audio data is compressed to low bit rates, the quality of the audio file gets deteriorated. In order to overcome this limitation, certain audio coding schemes were introduced, of which Code Excited Linear Prediction (CELP) encoding is one of the most popular speech encoding schemes. CELP encoding is a scheme of determining encoded parameters based on a human speech generating model. Most recent standard speech encoding schemes are based on CELP encoding. For example, G.729 enables narrowband signal encoding in bit rates of 8 Kbits/s, and AMW-WB enables wideband signal encoding in bit rates of 6.6 to 23.85 Kbits/s.

SUMMARY

The present invention provides for methods and apparatuses for processing audio data. In one embodiment, there is a provided a method for achieving bitstream scalability in a multi-channel audio encoder, said method comprising receiving audio input data; organizing said input data by a Code Excited Linear Prediction (CELP) processing module for further encoding by arranging said data according to significance of data, where more significant data is placed ahead of less significant data; and providing a scalable output bitstream. The organized CELP data comprises of a first part and a second part. The first part comprises a frame header, sub frame parameters and innovation vector quantization data from the first frame from all channels. The innovation vector quantization data from the first frames from all channels is arranged according to channel number. The second part comprises innovation vector quantization data from frames after first frame from all channels. The innovation vector quantization data from frames after first frame from all channels is arranged according to channel number.

An alternative embodiment of the present invention provides a method for decoding a scalable bitstream of multi-channel audio encoded data, said method comprising receiving said bitstream, wherein CELP data is arranged according to significance of data, where more significant data is placed ahead of less significant data in said bitstream; analyzing said bitstream data; and decoding said bitstream data in order of significance. The CELP data comprises of a first part and a second part. The first part comprises frame header, sub frame parameters and innovation vector quantization data from first frame from all input channels. The said innovation vector quantization data from first frames from all input channels is arranged according to input channel number. The second part comprises innovation vector quantization data from frames after first frame from all input channels. The innovation vector quantization data from frames after first frame from all input channels is arranged according to input channel number. The analyzing step further comprises identifying innovation vector quantization data from a first frame and from all frames after said first frame from all input channels. The decoding of bitstream data further comprises reconstructing data present in said bitstream using corresponding innovation quantization data.

In an alternative embodiment, there is provided a multi-channel audio encoder, said encoder provided with at least one means configured for: receiving audio input data; organizing said input data by a CELP processing module for further encoding by arranging said data according to significance of data, where more significant data is placed ahead of less significant data; and providing a scalable output bitstream. The encoder configured for organizing said input data to a first part and a second part. The encoder further configured for arranging innovation vector quantization data from a first frame from all channels according to channel number, wherein said innovation vector quantization data belongs to a first part in said organized CELP data. The encoder further configured for arranging innovation vector quantization data from frames after a first frame from all channels according to channel number, wherein said innovation vector quantization data belongs to a second part in said organized CELP data.

In an alternative embodiment, there is provided an audio decoder, said decoder provided with at least one means configured for: receiving a bitstream wherein CELP data is arranged according to significance of data, where more significant data is placed ahead of less significant data in said bitstream; analyzing said bitstream data; and decoding said bitstream data in order of significance. The decoder configured for identifying innovation vector quantization data from a first frame and from all frames after said first frame from all input channels by performing said analysis of said bitstream data. The decoder further configured for reconstructing data present in said bitstream using corresponding innovation vector quantization data by performing said decoding of said bitstream data in order of significance.

In an alternative embodiment, there is provided an article of manufacture comprising a bitstream of encoded audio data arranged according to significance of data, where more significant data is placed ahead on the bitstream. The data may be multi-channel CELP data. The multi-channel CELP data comprises of a first part and a second part. The first part comprises frame header, sub frame parameters and innovation vector quantization data from first frame from all channels. The innovation vector quantization data from first frames from all channels is arranged according to channel number. The second part comprises innovation vector quantization data from frames after first frame from all channels. The innovation vector quantization data from frames after first frame from all channels is arranged according to channel number.

A better understanding of above and other features and advantages of this invention may be had from a consideration of a detailed description below of some exemplary embodiments thereof; particularly if such consideration is made in conjunction with appended drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
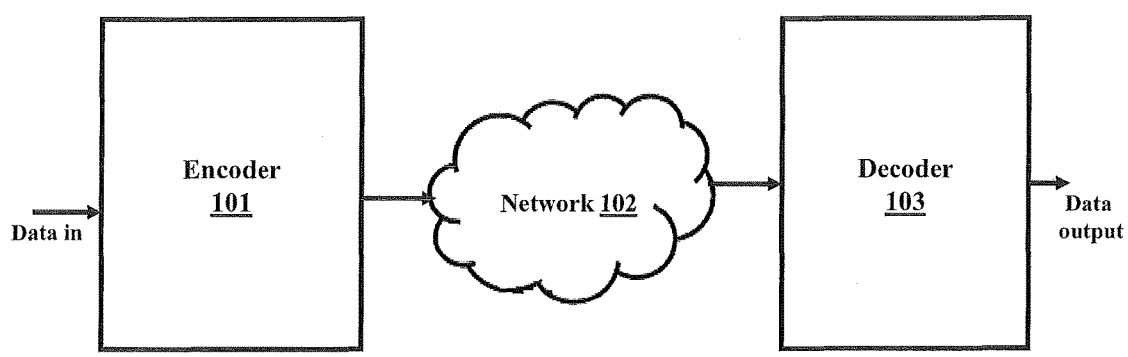
FIG. 1 illustrates a block diagram which shows a data encoding-decoding system, as disclosed in the embodiments herein.

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, and the like are used solely to distinguish one from another entity without necessarily requiring or implying any actual such relationship or order between such entities.

The present invention concerns processing audio signals, which is to say signals representing physical sound. These signals are represented by digital electronic signals. In the discussion which follows, analog waveforms may be shown or discussed to illustrate the concepts; however, it should be understood that typical embodiments of the invention will operate in the context of a time series of digital bytes or words, said bytes or words forming a discrete approximation of an analog signal or (ultimately) a physical sound. The discrete, digital signal corresponds to a digital representation of a periodically sampled audio waveform. As is known in the art, for uniform sampling, the waveform must be sampled at a rate at least sufficient to satisfy the Nyquist sampling theorem for the frequencies of interest. For example, in a typical embodiment a uniform sampling rate of approximately 44.1 thousand samples/second may be used. Higher sampling rates such as 96 khz may alternatively be used. The quantization scheme and bit resolution should be chosen to satisfy the requirements of a particular application, according to principles well known in the art. The techniques and apparatus of the invention typically would be applied interdependently in a number of channels. For example, it could be used in the context of a "surround" audio system (having more than two channels).

As used herein, a "digital audio signal" or "audio signal" does not describe a mere mathematical abstraction, but instead denotes information embodied in or carried by a physical medium capable of detection by a machine or apparatus. This term includes recorded or transmitted signals, and should be understood to include conveyance by any form of encoding, including pulse code modulation (PCM), but not limited to PCM. Outputs or inputs, or indeed intermediate audio signals could be encoded or compressed by any of various known methods, including MPEG, ATRAC, AC3, or the proprietary methods of DTS, Inc. as described in U.S. Pat. Nos. 5,974,380; 5,978,762; and 6,487,535. Some modification of the calculations may be required to accommodate that particular compression or encoding method, as will be apparent to those with skill in the art.

The present invention is described as an audio codec. In software, an audio codec is a computer program that formats digital audio data according to a given audio file format or streaming audio format. Most codecs are implemented as libraries which interface to one or more multimedia players, such as QuickTime Player, XMMS, Winamp, Windows Media Player, Pro Logic, or the like. In hardware, audio codec refers to a single or multiple devices that encode analog audio as digital signals and decode digital back into analog. In other words, it contains both an ADC and DAC running off the same clock.

An audio codec may be implemented in a consumer electronics device, such as a DVD or BD player, TV tuner, CD player, handheld player, Internet audio/video device, a gaming console, a mobile phone, or the like. A consumer electronic device includes a Central Processing Unit (CPU), which may represent one or more conventional types of such processors, such as an IBM PowerPC, Intel Pentium (x86) processors, and so forth. A Random Access Memory (RAM) temporarily stores results of the data processing operations performed by the CPU, and is interconnected thereto typically via a dedicated memory channel. The consumer electronic device may also include permanent storage devices such as a hard drive, which are also in communication with the CPU over an I/O bus. Other types of storage devices such as tape drives, optical disk drives may also be connected. A graphics card is also connected to the CPU via a video bus, and transmits signals representative of display data to the display monitor. External peripheral data input devices, such as a keyboard or a mouse, may be connected to the audio reproduction system over a USB port. A USB controller translates data and instructions to and from the CPU for external peripherals connected to the USB port. Additional devices such as printers, microphones, speakers, and the like may be connected to the consumer electronic device.

The consumer electronic device may utilize an operating system having a graphical user interface (GUI), such as WINDOWS from Microsoft Corporation of Redmond, Wash., MAC OS from Apple, Inc. of Cupertino, Calif., various versions of mobile GUIs designed for mobile operating systems such as Android, and so forth. The consumer electronic device may execute one or more computer programs. Generally, the operating system and computer programs are tangibly embodied in a computer-readable medium, e.g. one or more of the fixed and/or removable data storage devices including the hard drive. Both the operating system and the computer programs may be loaded from the aforementioned data storage devices into the RAM for execution by the CPU. The computer programs may comprise instructions which, when read and executed by the CPU, cause the same to perform the steps to execute the steps or features of the present invention.

The audio codec may have many different configurations and architectures. Any such configuration or architecture may be readily substituted without departing from the scope of the present invention. A person having ordinary skill in the art will recognize the above described sequences are the most commonly utilized in computer-readable mediums, but there are other existing sequences that may be substituted without departing from the scope of the present invention.

Elements of one embodiment of the audio codec may be implemented by hardware, firmware, software or any combination thereof. When implemented as hardware, the audio codec may be employed on one audio signal processor or distributed amongst various processing components. When implemented in software, the elements of an embodiment of the present invention are essentially the code segments to perform the necessary tasks. The software preferably includes the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information.

Examples of the processor readable medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operation described in the following. The term "data" here refers to any type of information that is encoded for machine-readable purposes. Therefore, it may include program, code, data, file, etc.

All or part of an embodiment of the invention may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

One embodiment of the invention may be described as a process which is usually depicted as a flowchart, a flow diagram, a structure diagram, or a block diagram. Although a block diagram may describe the operations as a sequential process, many of the operations can be performed in parallel or concurrently. In addition, the order of the operations may be re-arranged. A process is terminated when its operations are completed. A process may correspond to a method, a program, a procedure, etc.

DEFINITIONS

Innovation vector quantization: Innovation vector quantization is a quantization method used for quantizing speech/audio signals so as to achieve data compression. In the innovation vector quantization method, at least one optimum innovation vector for a given speech signal is selected from an innovation codebook. Further, an index of the selected optimum innovation vector may be transmitted to a receiver. Further, at the receiver end, a decoder may identify the optimum innovation vector used for quantization using the received innovation vector index and may retrieve the original information.

Innovation vector index: An innovation vector index is an index in an innovation codebook referring to specific innovation vectors. Each innovation vector has a unique innovation vector index in the innovation codebook. While performing innovation vector quantization, an encoder may transmit the innovation vector index corresponding to the used optimum innovation vector to the receiver side. Further, the decoder at the receiver side may use the received innovation vector index to identify the optimum innovation vector and to retrieve original information.

Innovation codebook: an innovation codebook may be a database that comprises sets of possible excitation sequences for a block of innovation vectors. The innovation vectors and their excitation sequence values present in the innovation codebook may be used while performing innovation vector quantization. The entries in the innovation codebook may be adaptively constructed from previous portions of the signal being processed Innovation vectors: Innovation vectors are vector-quantized entries that are stored in an innovation codebook.

Prediction Coefficients: Prediction coefficients are Linear Prediction Coefficients used to post-filter an excitation to model effects of a human vocal tract or otherwise shape a signal in the frequency domain.

Mode ID: Mode ID indicates the quality mode at a frame level based on which CELP encoding is performed. The quality in encoding may be an indicator of encoding bitrate and/or mflops, among others.

LSP (Line spectral pairs): LSP are encoded Linear Prediction Coefficients. The Linear Prediction Coefficients represent filter coefficients that are associated with Linear Predictive Coding.

OL pitch: OL Pitch indicates the pitch period value estimated using an 'open-loop' method in a CELP encoder at a frame level.

OL pitch gain: OL pitch gain indicates pitch gain value estimated using an 'open-loop' method in a CELP encoder at a frame level.

Fine Pitch: Fine pitch indicates the pitch value estimated using a closed loop analysis at a sub-frame level.

Pitch Gain: Pitch gain indicates pitch gain value estimated using a closed loop analysis at a sub-frame level.

Innovation gain: Innovation gain is a gain estimate based on a previous excitation, and applied to innovation vectors.

The embodiments herein disclose a mechanism for achieving scalability in an audio coding system by arranging data in the order of significance in the bitstream. Referring now to the drawings, and more particularly to FIGS. 1 through 6, where similar reference characters denote corresponding features consistently throughout the figures, there are shown embodiments.

FIG. 1 illustrates a block diagram which shows a data encoding-decoding system, as disclosed in the embodiments herein. The system may comprise an encoder 101, a network 102 and a decoder 103. The data to be encoded may be fed as input to the encoder 101. The encoder 101 may be a CELP encoder. Upon receiving the input data, the encoder 101 may analyze the data and may identify the data in the order of significance. The encoder 101 may identify more significant data and less significant data. Further, the encoder 101 may extract/split data from the received input signal and may arrange the data in the order of significance in a bitstream. The most significant data may be arranged in the beginning of the bitstream, and the less significant data may be arranged towards the end of the bitstream. Innovation vectors corresponding to the encoded data may be considered as less significant data and prediction coefficients may be considered as more significant data. In an embodiment, significance of the innovation vectors may vary as they are summed together with different amplitudes, thereby bringing more or less audible changes to the composed signal. The prediction coefficients may be used by the decider 103 to decode the bitstream and hence may be considered as more significant information. At the same time, the decoder 103 may use the innovation vectors so as to maintain quality in the scaled data. As the quality may be compromised depending on scalability requirements, the innovation vectors may be considered as less significant data. Any data that is essential for the decoder 103 to decode the bitstream may be considered as more significant data. Less significant data may refer to data being used to add/increase the quality of scaled data. The bitstream may comprise more significant data as well as less significant data. Further, the amount of less significant data in the bitstream may vary based on bandwidth availability and/or quality requirements of the encoded bitstream. According to the requirements, the less significant data may be chopped off to adjust the data size to fit the bandwidth of the channel used. The system may differentiate between less significant data and more significant data based on position of the data in the bitstream. The system may assume the data towards the end of the bitstream is less significant and the data at the beginning of the bitstream is more significant and may remove the identified less significant data from the bitstream to attain scalability. Further, the encoder 101 may encode the bitstream using a suitable encoding scheme. For example, the encoding scheme used for encoding the bit sequence may be Huffman coding or entropy coding or any such suitable coding technique.

In an embodiment of the present invention, the arrangement of data in the order of significance in the bitstream may help to improve the scalability of the encoding scheme, while still affording the maximum quality to the data. When data arranged in the order of significance is scaled, less significant data at the tail of the bitstream may be discarded. This may help satisfy bandwidth requirements and at the same time may help maintain data quality by not removing more significant data which is present in the beginning of the bitstream. Further, the encoded data/signal may be stored in a memory module of the transmitting device for future use, before transmitting the encoded data/signal to the decoder 103.

Further, the encoded data may be transmitted across a network 102 to the destination. The encoded data may be transmitted over conventional transmission protocols, such as a wireless/wired channel in the network 102.

The transmitted encoded data may be received by the decoder 103. The decoder 103 may analyze the received encoded data. The decoder also may receive from the encoder 101, signals such as tonal components, Low Frequency effects (LFE), and the like, which may have been filtered during the encoding process 101. The signals such as tonal components, Low Frequency effects (LFE), and the like may be kept in different chunks in the same bitstream and may be transmitted. Further, the decoder 103 may decode the encoded data using the received signal components and other parameters. For example, in a CELP decoding scheme, the decoder 103 may receive information such as an innovation vector index of the innovation codebook and other signal components. The innovation codebook may contain excitation sequences used for encoding. The decoder 103 then may decode the received encoded signal using the innovation vector indexes to synthesize parts of the signal. Further, the decoder 103 may add the tonal components, LFE, and so on to the reconstructed signal to reproduce the original signal.

Figure 2:
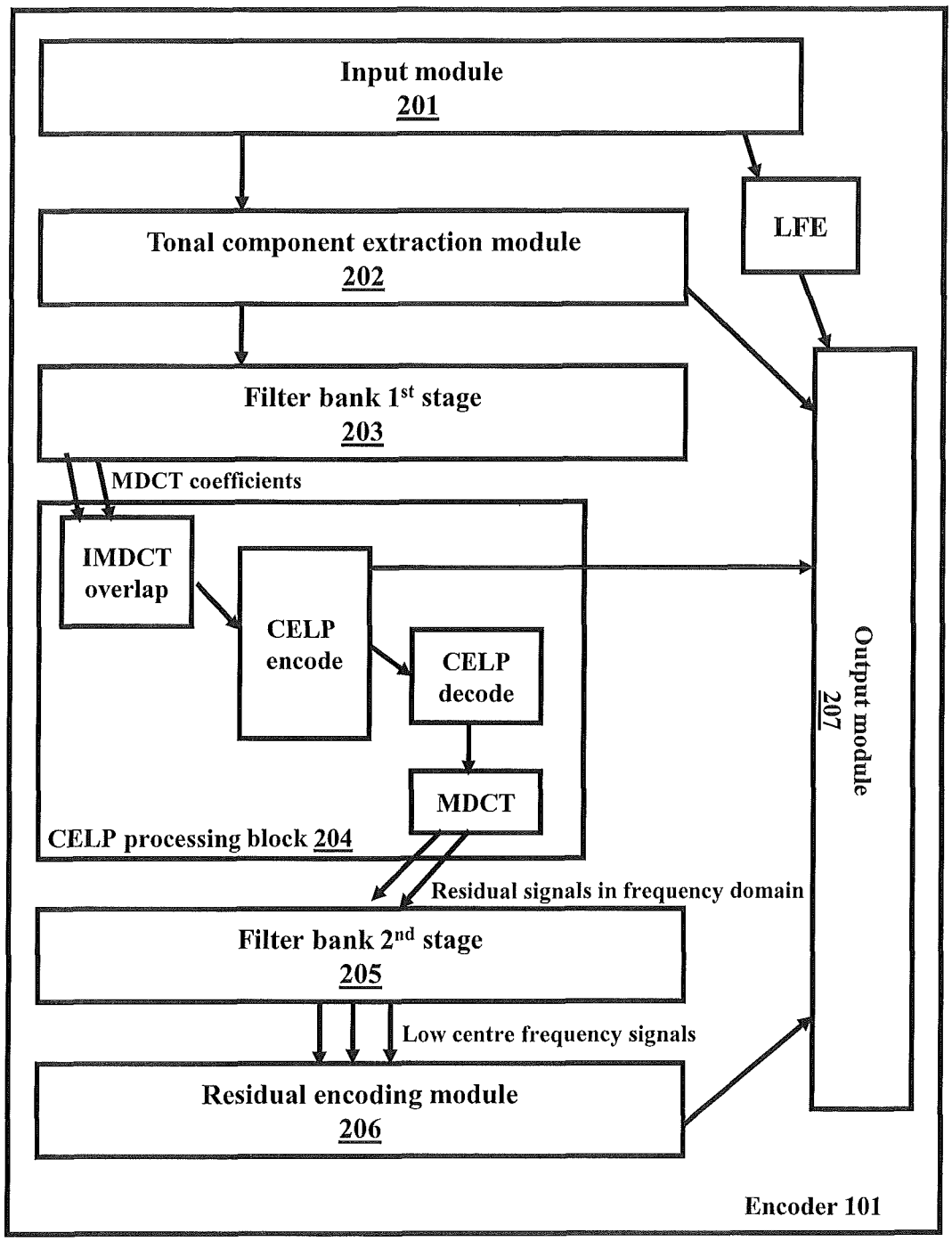
FIG. 2 is a block diagram which shows components of proposed encoder, as disclosed in the embodiments herein.

FIG. 2 is a block diagram which shows components of an encoder, as disclosed in the embodiments herein. The encoder may comprise input module 201, tonal component extraction module 202, filter bank $1^{st}$ stage 203, CELP processing block 204, filter bank $2^{nd}$ stage 205, residual encoding module 206, and an output module 207. The input data signal may be fed to the input module 201. The input data may be any audio signal, such as a speech signal or a conventional audio signal. From the input module 201, the data may be fed to the tonal component extraction module 202. Tonal components may be components of the input audio data, for which most of their energy is within narrow frequency region around certain base frequency. The tonal component extraction module 202 may extract tonal components present in the signal using any suitable signal processing technique. For example, the system may use a suitable technique such as "matching pursuit", "exhaustive search", and so on, for tonal component extraction. In an embodiment, the bandwidth of the output of tonal extraction may be the same as that of the input signal.

Once the tonal components are extracted from the input signal, the remaining signal, which is called a residual signal, may be fed to a $1^{st}$ stage filter bank 203. The filter bank 203 may comprise an array of band pass filters that convert the input signal into multiple components called MDCT bins/MDCT coefficients/frequency lines. Each signal component may carry a single frequency sub band of the original input signal. The filter bank 203 may also convert the sub bands to a low center frequency that can be re-sampled at a reduced rate.

The MDCT coefficients from the output of the $1^{st}$ stage filter bank 203 may be fed to the CELP processing block 204. In a preferred embodiment, only selected MDCT coefficients may be fed into the CELP processing block 204. The MDCT coefficients fed into the CELP processing block 204 may be converted into the time domain by using an inverse modified discrete cosine transform (IMDCT) processing, according to an embodiment.

Further, CELP coding may be applied to the MDCT coefficients which are in the time domain. In one embodiment, the CELP encoding block identifies the significance of data present in the MDCT coefficients to be encoded. Further, the data is arranged in the order of significance into a bit sequence. More significant data may be arranged in the beginning of the bit sequence and less significant data may be arranged towards end of the bit sequence. Further, the residual signals in the time domain may be converted back to frequency domain using modified discrete cosine transform (MDCT) processing. The output signal from the CELP processing block 204 may be a CELP processed residual signal in the frequency domain.

The residual signals in the frequency domain may then be passed onto a $2^{nd}$ stage filter bank. At the $2^{nd}$ stage filter bank module, the residual signals may be further converted to low center frequency components.

The low center frequency components from the filter bank $2^{nd}$ stage may then be passed through a residual encoding module 206. This may result in the formation of residual components. In one embodiment, during the encoding operation, the residual encoding module 206 may position some data towards the end of the bitstream (i.e. the less significant data). The encoded residual signal may then be transmitted to the decoder using the output module 207.

Figure 3A:
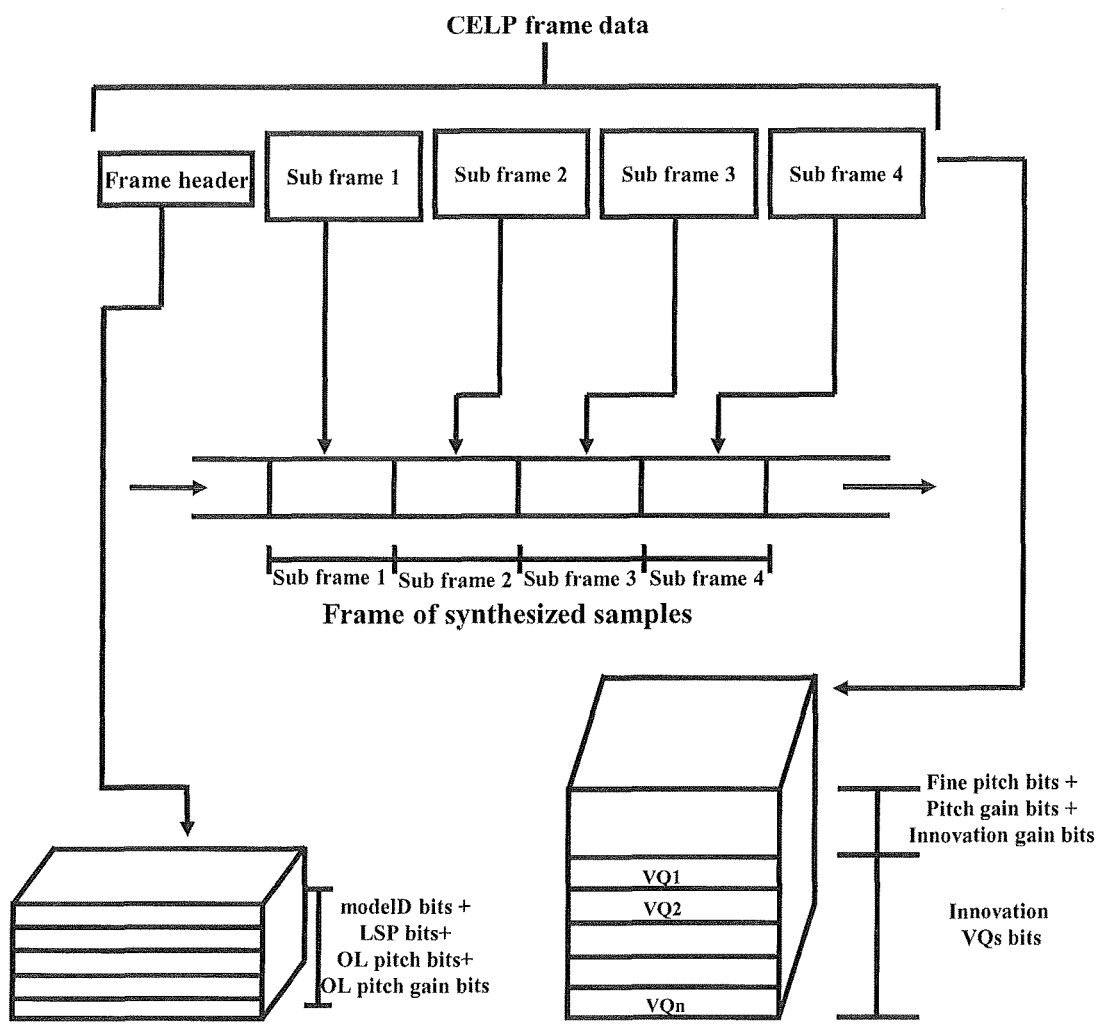
FIGS. 3A, 3B and 3C illustrates an arrangement of parameters in a bitstream and structure of a low bit rate (LBR) data frame respectively, as disclosed in the embodiments herein.
Figure 3B:
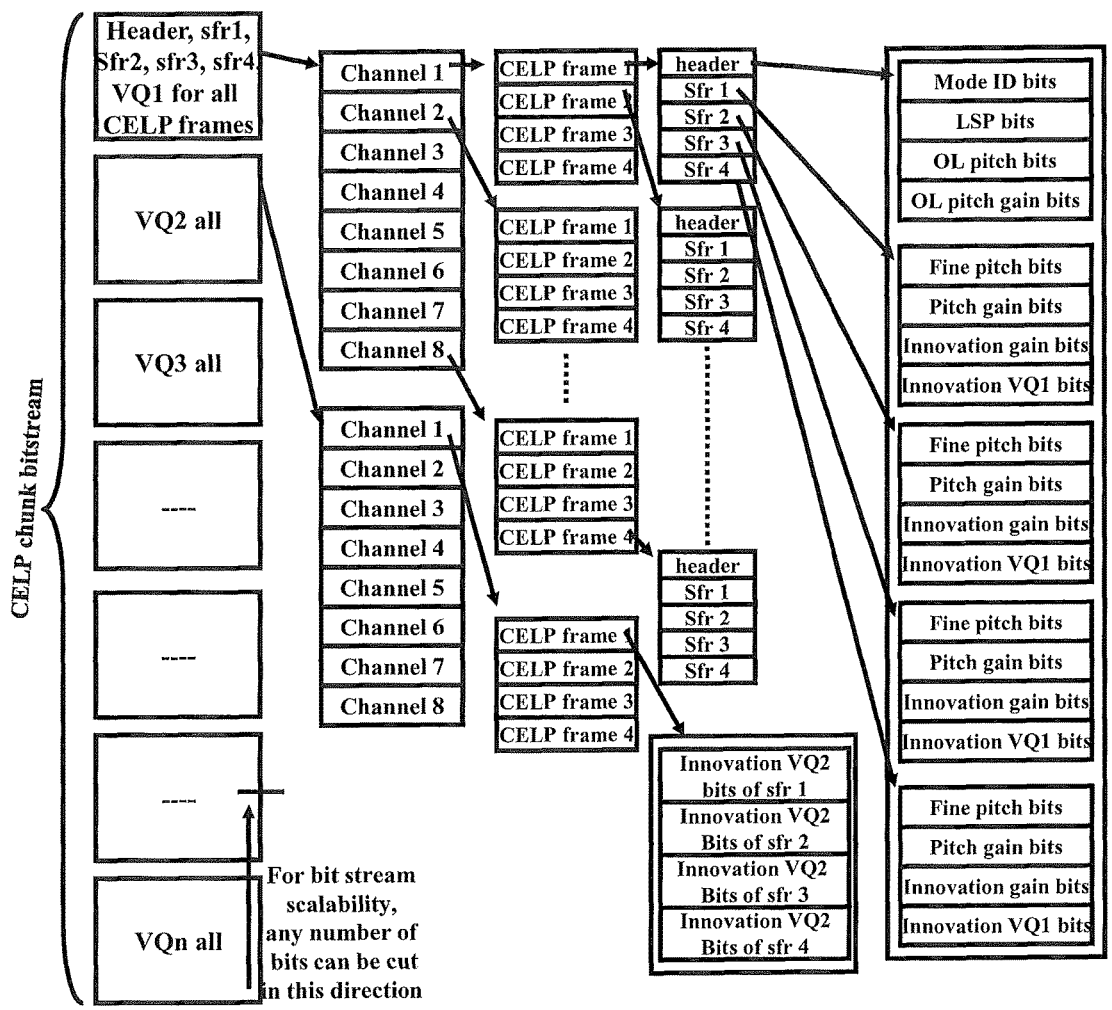
Figure 3C:
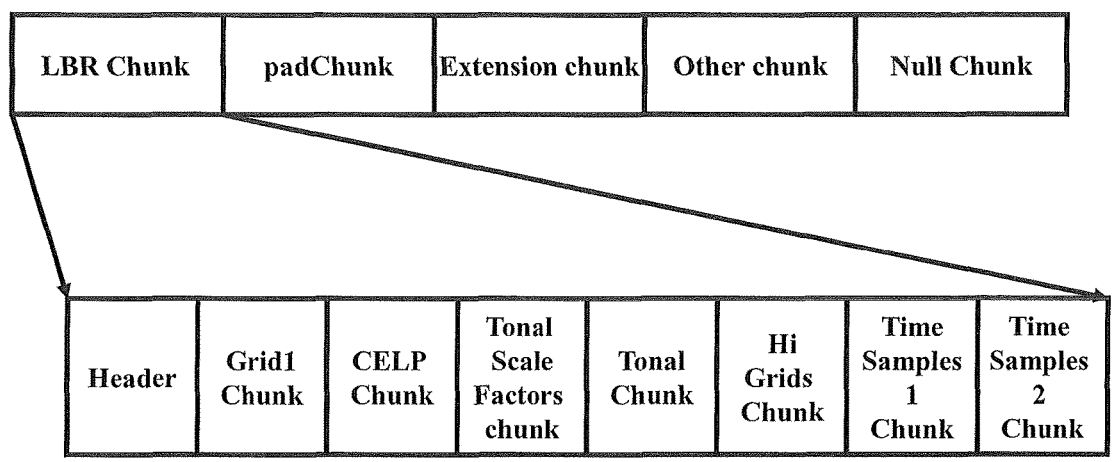

FIGS. 3A, 3B and 3C illustrate an arrangement of parameters in a bitstream and a structure of a low bit rate (LBR) data frame respectively, as disclosed in the embodiments herein. The bitstream as depicted in FIG. 3A may comprise data arranged in the form of sub-frames. For example, the bitstream may be a CELP chunk bitstream as depicted in FIG. 3C. The data in the CELP bitstream may comprise two parts: a first part of information and a second part of information. The first part of information may comprise a CELP frame header, sub frame parameters, and a first innovation vector quantization (VQ1) from four CELP frames and for all of the channels. The second part of information may comprise the remaining innovation vector quantizations (VQ2 to VQn). While forming the second part of information, only the innovation vector quantizations VQ2 to VQn may be used. Innovation vectors from all sub-frames of four CELP frames for all channels may be used to form the VQ2 block. Other vector quantizations VQ3, VQ4 up to VQn may be formed in a similar way. The frame header may further comprise data such as mode ID bits, LSP bits, OL pitch bits, OL pitch gain bits and so on, which represent various CELP prediction coefficients used to encode the data. Further, each of the sub frames may comprise information such as fine pitch bits, pitch gain bits, innovation gain bits, and so on.

In the sub-frame arrangement of data, data may be arranged in the order of significance. The first part of information may be considered as more significant data and the second part of information may be considered as less significant information. More significant data (first part of information) may be arranged towards the beginning of the bitstream and less significant data (second part of information) may be arranged towards the end of the bitstream. This architecture may promote the encoder 101 to effectively scale data ensuring maximum quality to the scaled data. When data is to be scaled, less significant data (i.e., data towards end of the bitstream) may be discarded and the more significant data may be transmitted. This may allow the more significant data (misdelivery/loss of which will affect system throughput adversely) to be delivered to the destination. In an embodiment, a bit flag may be put in the bitstream that may indicate whether CELP encoding is done or not on the data. By considering the value of this bit flag, the decoder 103 may identify whether CELP encoding has been performed on the received data.

The data arranged in the order of significance may be distributed (as depicted in FIG. 3B) over the channels such that each channel transmits all four CELP frames. Each of the CELP frames may further comprise the first part of information and the second part of information. The first part of information and the second part of information may further comprise corresponding parameters. The first part of information may comprise data such as line spectral pair (prediction) coefficients, open loop pitch and fine pitch coefficients, pitch gain, and so on, and the second part information may comprise data such as innovation vectors.

The CELP bitstream may be further enclosed in a LBR (Low Bit Rate) frame (as depicted in FIG. 3C) in the form of a CELP chunk. The LBR frame may comprise information such as LBR chunk, padChunk, extension chunk, other chunks, null chunks and so on. Each chunk may be a fragment of information indicating different information associated with the encoded data and the encoding parameters such as indexes and so on. Each chunk may further comprise a header part and variable data information. The header may comprise information such as type of chunk, comments, size, and so on. Further, the variable data information may comprise information decoded from various parameters in the header. The CELP chunk may be associated with the variable area of the LBR chunk. For example, the LBR chunk may comprise information such as a header, a grid 1 chunk, a CELP chunk, a tonal scale factors chunk, a tonal chunk, a Hi Grids chunk, a time samples1 chunk, a time samples2 chunk, and so on, arranged in a suitable order/format. Further, each field in the LBR chunk may comprise corresponding parameters. For example, the LBR chunk header may comprise parameters that define what kind of chunks are present in the LBR chunk, sample rate of the original signal, number of channels in the signal and so on.

Figure 4:
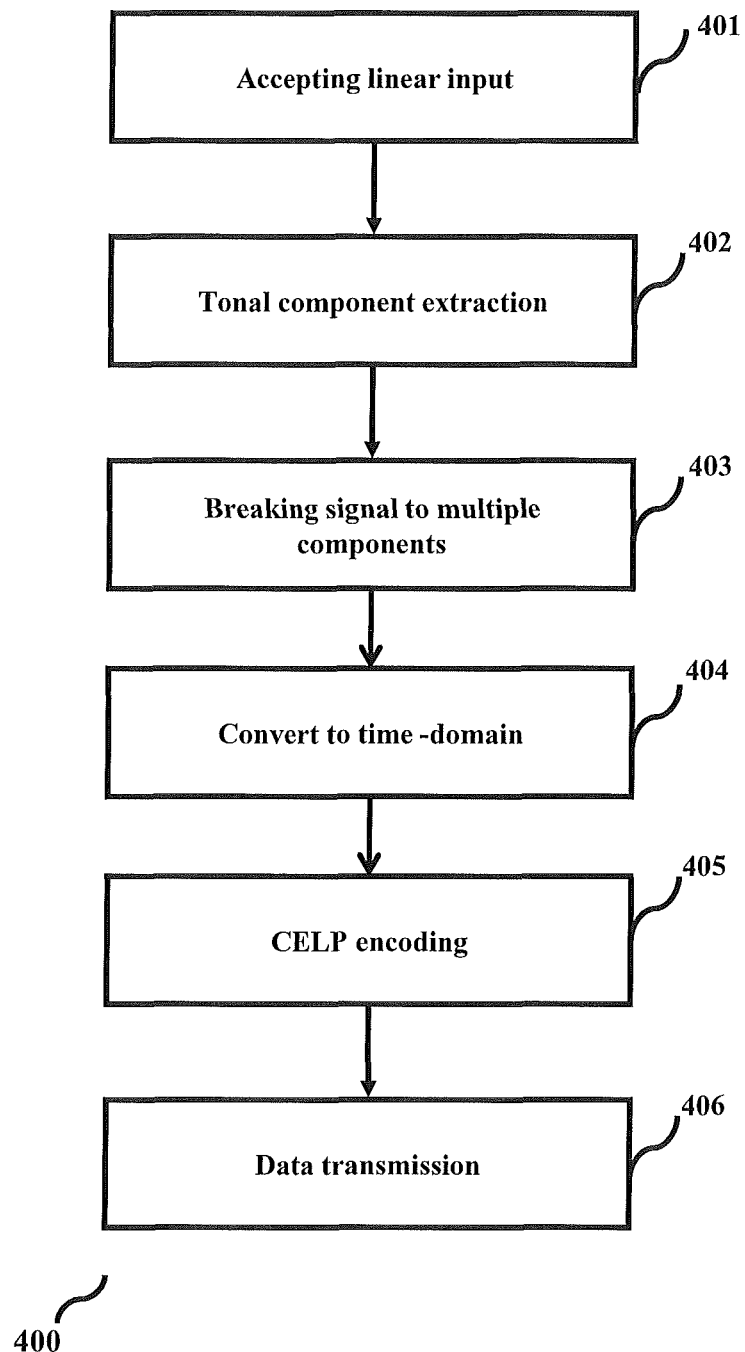
FIG. 4 is a flow diagram which shows steps involved in the process of encoding an input bitstream, as disclosed in the embodiments herein.

FIG. 4 is a flow diagram which shows steps involved in the process of encoding an input bitstream, as disclosed in the embodiments herein. The encoder 101 may accept (401) data to be encoded as input. In one embodiment, the input data may be speech/audio data. Further, the encoder 101 may remove (402) tonal components from the received data input. Tonal components may be components for which most of their energy is within a narrow frequency region around a certain base frequency. The input speech/audio signal may be in the time domain (i.e. value of the signal change with time). In order to encode the time varying signal efficiently, the input speech/audio signal may be split (403) into multiple components called frames/blocks. The system may use a filter bank to split the input speech/audio signal into multiple components. The filter bank may comprise a plurality of band pass filters that filter the speech/audio signal to multiple components. Further, each frame/block may comprise a certain number of speech/audio samples at a particular sampling frequency. For example, in the LBR codec, frame length may be 1024 or 2048 or 4096 samples at sample rates of 8 kHz, 44.1 kHz, 48 kHz, and 96 kHz.

The signal components may originally be in the frequency domain. In order to perform encoding, the signal components may be converted/transformed (404) into the time domain. In order to convert the signal components to the time domain, a suitable transform may be used. In one embodiment, the transform used may be an inverse modified discrete cosine transform (IMDCT), or any such technique. Further, CELP coding may be applied (405) to the time domain data.

At the outset of the CELP coding process, the data may be arranged in the order of significance, in a bit sequence. More significant data may be arranged towards beginning of the bitstream, whereas less significant data may be arranged towards end of the bit sequence. Further, on this newly formed bit sequence, CELP coding may be applied. In this process, the encoder 101 selects an optimum innovation vector corresponding to each of the data frames, from an innovation codebook associated with the CELP encoder 101. The innovation codebook may comprise information on innovation vectors corresponding to each data sequence. The innovation vector suitable for each of the bit sequences may be obtained by performing an exhaustive search in the innovation codebook. Further, each of the innovation vectors may be arranged in the innovation codebook against a unique innovation vector index number. After identifying the innovation vector corresponding to each of the bit sequences in the input data frames, the unique index numbers corresponding to each of the data frames may be transmitted (406) to the receiver end. Data such as low frequency signals may be transmitted along with the encoded signal. In one embodiment, the encoding scheme may be used in lossless as well as lossy compression schemes. For example, the proposed audio encoding scheme may be used with DTS compression schemes such as DTS master audio, DTS coherent acoustics, and so on.

Further, the audio encoding scheme may be used in encoder-decoder systems that pass data over a channel with varying bandwidth and may also help to fit multiplexed data streams to a single fixed bandwidth channel. The arrangement of data in the CELP encoding method facilitates the re-use of a bitstream encoded at a higher bit rate for transmission at a lower bit rate. This may be achieved by discarding least significant data from the end of every frame, and effectively re-packing the audio to a lower bit rate. This avoids re-encoding in the encoding process.

Further, the proposed architecture may be capable of adapting to any bandwidth change in the transmission channel by adjusting the quality of the signal instantly when bandwidth of the channel is reduced.

The proposed architecture may also be used in lossy compression schemes to replicate parts of the bitstream carrying more significant information. In such systems, it may be useful to replicate more significant information as opposed to less significant information to maintain a higher signal quality. The mechanisms disclosed herein may allow for easier identification and retrieval of the more significant part of a signal.

The various actions in method 400 may be performed in the order presented, in a different order, concurrently or simultaneously. Further, in some embodiments, some actions listed in FIG. 4 may be omitted.

Figure 5:
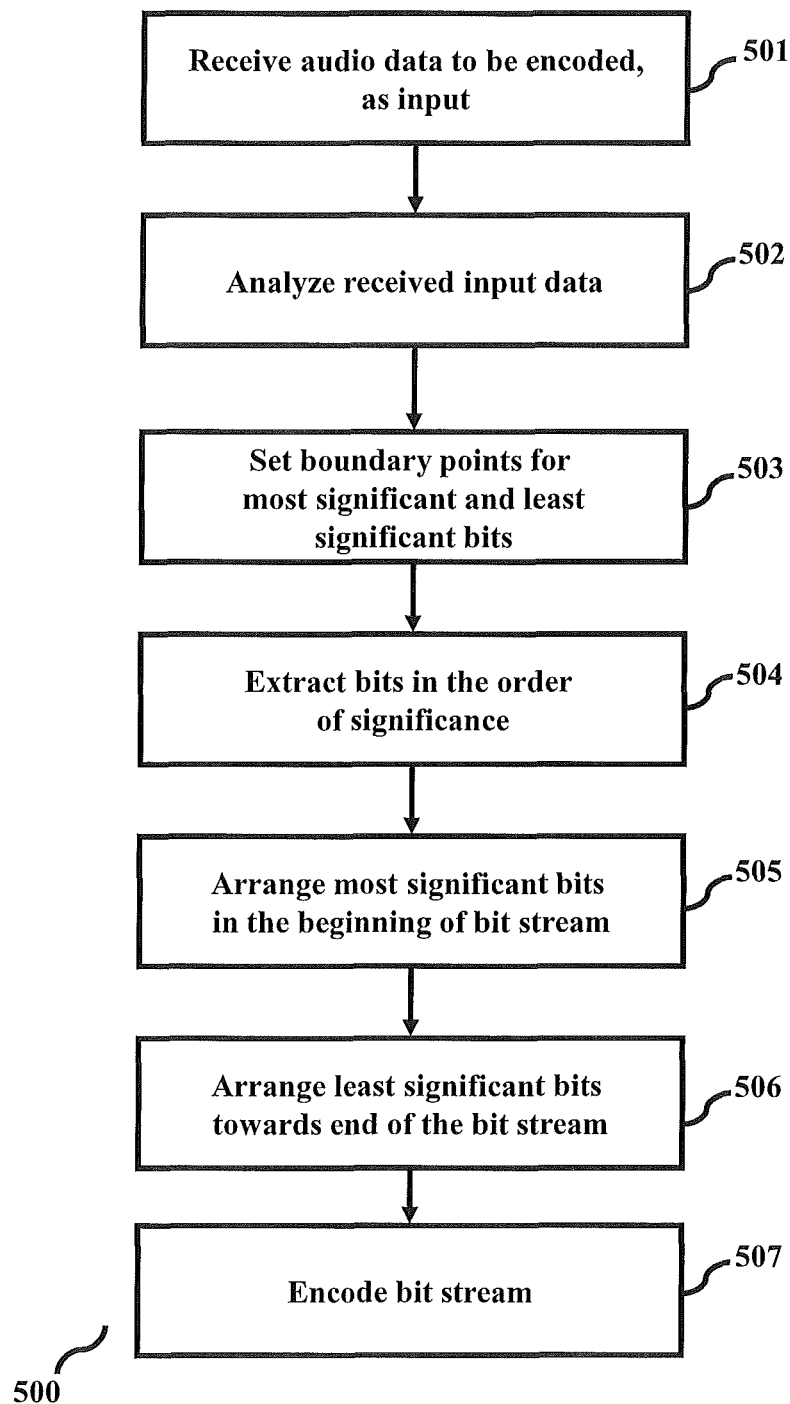
FIG. 5 is a flow diagram which shows steps involved in the process of splitting data in a bitstream and arranging the split data in the bitstream in the order of significance, as disclosed in the embodiments herein.

FIG. 5 is a flow diagram which shows steps involved in the process of splitting data in a bitstream and arranging the split data in the bitstream in the order of significance, as disclosed in the embodiments herein. In the proposed encoding scheme, the data may be arranged in the order of significance in the bitstream, before encoding the data sequence. Further, when the data is to be compressed, part of the bitstream where less significant data resides, may be chopped off. By doing so, the system may be able to ensure that more significant data (the transmission and delivery of which will affect the throughput of the system critically), is properly transmitted and delivered to the destination.

In order to do this, the encoder 101 may receive (501) the data to be encoded, as input. Further, the encoder 101 may analyze (502) the data. In an embodiment, the encoder 101 may analyze the input data to identify more significant data and less significant data. Innovation vectors corresponding to the encoded data may be considered as less significant data and prediction coefficients may be considered as more significant data. Significance of data may vary based on the extent to which they are important in the bitstream scaling process. The prediction coefficients may be used by the decider 103 to decode the bitstream and hence may be considered as more significant information. At the same time, the decoder 103 may use the innovation vectors to adjust quality in the scaled data. As the quality may be compromised depending on scalability requirements, the innovation vectors may be considered as less significant data. Any data that should be kept in the bitstream for the decoder 103 to be able to efficiently decode the received encoded data may be considered as more significant data. Less significant data may refer to any data that may be used to add/increase quality of scaled data, but may be chopped off to adjust data size to fit the bandwidth of the channel being used. In various embodiments, significance of data may be determined by the placement of data in a frame. The closer the data is to the end of a frame, the less significant the data may be. Also, a frame may comprise various chunks, and some of the chunks may be considered more important than others depending on the application. Once the encoder 101 identifies more significant data and less significant data in the received input signal, then the encoder 101 may set (503) boundary points between the identified more significant and less significant data.

Further, the decoder 101 may extract (504) bits from the received data in the order of significance. For example, more significant data and less significant data may be extracted separately from the received input data. Further, the encoder 101 may arrange the retrieved data in the order of significance. In one embodiment, data may be arranged (505) such that the most significant bits are placed in the beginning of an encoded bitstream and the less significant bits are placed towards the end of the encoded bitstream. FIGS. 3A, 3B and 3C show how data may be arranged in the bitstream in the order of significance, according to an embodiment. More significant data may be arranged towards beginning of the bitstream and less significant data may be arranged towards end of the bitstream.

Once the data is arranged in the order of significance, then the data may be encoded (507) using a suitable encoding scheme. For example, the encoding used for encoding the bit sequence may be Huffman coding, entropy coding, or any such suitable coding technique.

In an embodiment, the mechanism of encoding data after arranging in the order of significance may help the encoder 101 to scale the data without affecting/losing more significant information in the data being scaled. While scaling the data, the encoder 101 may drop less significant information present in the bitstream. This may help to ensure safe transmission and delivery of more significant data to the destination/decoder 103. In an embodiment, the encoding system may differentiate between less significant data and more significant data based on the position of data in the bitstream. Data towards end of the bitstream may be considered as less significant and data at the beginning of bitstream may be considered as more significant data. Further, the data towards end of the bitstream may be dropped to achieve scaling. The various actions in method 500 may be performed in the order presented, in a different order, or simultaneously. Further, in some embodiments, some actions listed in FIG. 5 may be omitted.

Figure 6:
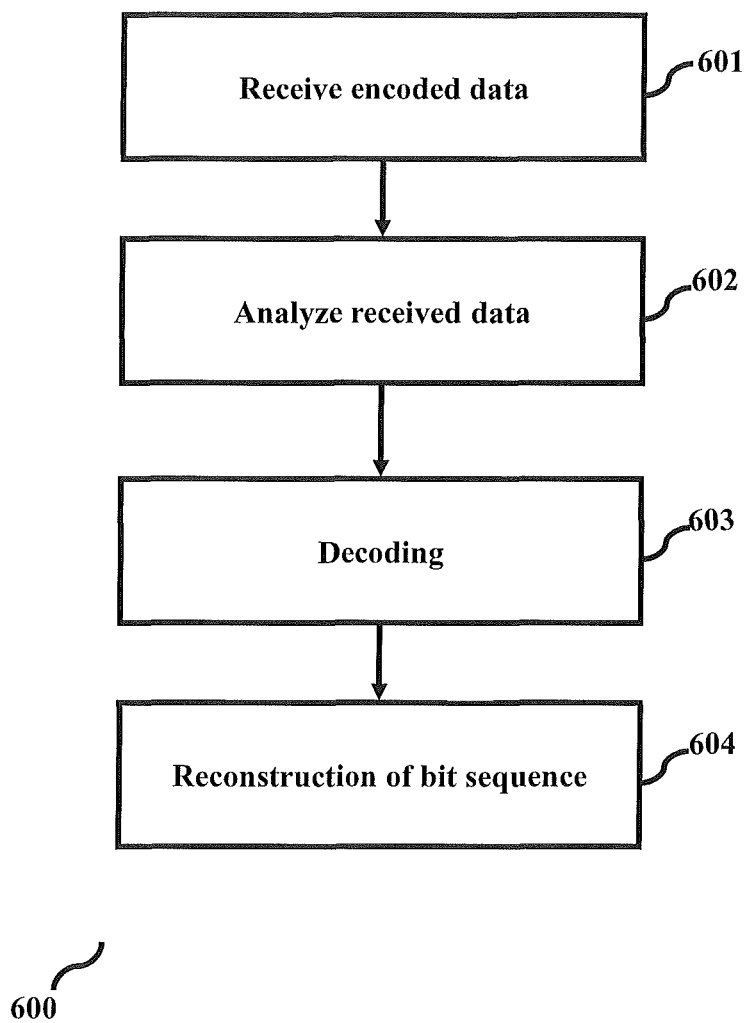
FIG. 6 is a flow diagram which shows steps involved in the process of decoding encoded data at a receiver end, as disclosed in the embodiments herein.

FIG. 6 is a flow diagram which shows steps involved in the process of decoding encoded data at a receiver end, as disclosed in the embodiments herein. In this process, a decoder 103 at the receiver end/destination may receive (601) the encoded data transmitted from the sending end. In an embodiment, the encoder 103 may also receive data such as low frequency components, and so on, extracted from the audio data at the time of encoding. Further, the decoder 103 may analyze (602) the received encoded data. In an embodiment, the decoder 103 may analyze the received encoded data to identify the innovation vector indexes transmitted by the encoder 101.

Further, the decoder 103 may perform (603) decoding of the received encoded data. In this process, the decoder 103 may compare the innovation codebook indexes transmitted by the encoder 101 with the innovation codebook. In an embodiment, the encoder 101 and the decoder 103 may share one innovation codebook. In another embodiment, the encoder 101 and the decoder 103 may use dedicated innovation codebooks. By identifying the innovation vectors corresponding to the indexes transmitted by the encoder 101, and by using other signals such as low frequency signals transmitted by the encoder 101, the decoder 103 may reconstruct (604) the original signal. In an embodiment, the decoder 103 can selectively pick more or less information in the order of significance, from the received encoded data. The decoder 103 may decide which data is to be picked based on requirements of the user and the system. For example, addition of less significant data may help to increase quality of the data. More or less amounts of less significant data may be selected according to the quality requirement of the output data. The various actions in method 600 may be performed in the order presented, in a different order or simultaneously. Further, in some embodiments, some actions listed in FIG. 6 may be omitted.

In an embodiment, the proposed mechanism may support selective use of CELP coding. For example, if the signal has high peak to noise ratio, then CELP encoding may be used to encode that signal.

The embodiments disclosed herein can be implemented through at least one software program running on at least one hardware device and performing network management functions to control the network elements. The network elements shown in FIG. 2 may include blocks which can be at least one of a hardware device, or a combination of hardware device and software module.

The embodiment disclosed herein specifies a system for improving scalability in audio encoding. The mechanism may allow arrangement of data in the order of significance in a bitstream, providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for achieving bitstream scalability in a multi-channel audio encoder, said method comprising:

receiving audio input data;

organizing said input data using a Code Excited Linear Predictor (CELP) encoder for further encoding by arranging said data according to significance of data to obtain organized CELP data, where more significant data is placed ahead of less significant data such that the organized CELP data includes a first part and a second part, the first part containing a frame header, sub frame parameters, and a first innovation vector quantization (VQ1) from four CELP frames and for all channels in the mufti-channel audio and the second part containing remaining innovation vector quantizations (VQ2 to VQn) excluding the first vector quantization (VQ1);

arranging the first innovation vector quantization from a first frame of each channel in the multi-channel audio according to channel number, wherein the first innovation vector quantization belongs to the first part in the organized CELP data;

arranging the remaining innovation vector quantizations from frames after the first frame from ail channels according to channel number, wherein the remaining innovation vector quantizations belong to the second part in the organized CELP data;

providing a scalable output bitstream, wherein the first part contains more significant data as compared to the second part and is arranged toward the beginning of the scalable output bitstream; and reusing the scalable output bitstream that has been encoded at a higher bitrate so as to scale the scalable output bitstream by discarding at least some of the less significant data from the end of every frame and effectively repacking the audio input data to a lower bitrate.

2. A method for decoding a scalable bitstream of multi-channel audio encoded data, said method comprising:

receiving said bitstream, wherein organized CELP data is arranged according to significance of data, where more significant data is placed ahead of less significant data in said bitstream such that the organized CELP data includes a first part and a second part, the first part containing a frame header, sub frame parameters, and a first innovation vector quantization (VQ1) from four CELP frames and for all channel in the multi-channel audio and the second pan containing remaining innovation vector quantizations (VQ2 to VQn) excluding the first vector quantization (VQ1), wherein the first part contains more significant data as compared to the second part and is arranged toward the beginning of the scalable bitstream, and reusing the scalable bitstream encoded at a higher bitrate so as to scale the scalable bitstream by discarding at least some of the less significant data from the end of every frame and effectively repacking the multi-channel audio encoded data to a lower bitrate;

arranging the first innovation vector quantization from a first frame of each channel in the multi-channel audio according to channel number, wherein the first innovation vector quantization belongs to the first part in the organized CELP data;

arranging the remaining innovation vector quantizations from frames after the first frame from all channels according to channel number, wherein the remaining innovation vector quantizations belong to the second part in the organized CELP data;

analyzing said bitstream using a decoder configured to perform analysis of said bitsream; and decoding said bitstream in order of significance using the decoder.

3. The method as in claim 2, wherein said analyzing further comprises identifying data from the first innovation vector quantization from a first frame and data from the remaining innovation vector quantizations from all frames of each channel in the multi-channel audio other than from the first frame of each channel in the multi-channel audio.

4. The method as in claim 2, wherein said decoding of bitstream further comprises reconstructing data present in said bitstream using corresponding innovation vector quantizations.

5. A multi-channel audio encoder, said encoder provided with at least one means configured for;

receiving audio input data;

organizing said input data by a CELP processing module for further encoding by arranging said data according to significance of data to obtain organized CELP data, where more significant data is placed ahead of, less significant data such that the organized CELP data includes a first part and a second part, the first part containing a frame header, sub frame parameters, and a first innovation vector quantization (VQ1) from four CELP frames and for all channels in the multi-channel audio and the second part containing remaining innovation vector quantizations (VQ2 to VQn) excluding the first vector quantization VQ1);

arranging the first innovation tor quantization from a first frame of each channel in the multi-channel audio according to channel number, wherein the first innovation vector quantization belongs to the first part, in the organized CELP data;

arranging the remaining innovation vector quantizations from frames after the first frame from all channels according to channel number, wherein the remaining innovation vector quantizations belong to the second part in the organized CELP data;

providing a scalable output bitstream, wherein the first part contains more significant data as compared to the second part and is arranged toward the beginning of the scalable output bitstream;

reusing the scalable output bitstream that has been encoded at a higher bitrate so as to scale the scalable output bitstream by discarding at least some of the less significant data from the end of every frame and effectively repacking the audio input data to a lower bitrate.

6. An audio decoder, said decoder, provided with at least one means configured for;

receiving a bitstream wherein CELP data is arranged according to significance of data, where more significant data is placed ahead of less significant data in said bitstream such that the CELP data includes a first part and a second part, the first part containing a frame header, sub frame parameters, and a first innovation vector quantization (VQ1) from four CELP frames and for all channels in multi-channel audio and the second part containing remaining innovation vector quantizations (VQ2 to VQn) excluding the first vector quantization (VQ1), wherein the first part contains more significant data as compared to the second part and is arranged toward the beginning of the bitstream, and wherein the first innovation vector quantization from a first frame of each channel in the multi-channel audio is arranged according to channel number, wherein the first innovation vector quantization belongs to the first part in the organized CELP data, and wherein the remaining innovation vector quantizations from frames after the first frame from all channels are arranged according to channel number, wherein the remaining innovation vector quantizations belong to the second part in the organized CELP data, and wherein the bitstream is encoded at a higher bitrate so as to scale the bitstream by discarding at least some of the less significant data from the end of every frame and effectively repacking the CELP data to a lower bitrate;

analyzing said bitstream; and decoding said bitstream in order of significance.

7. The decoder as in claim 6 is further configured for identifying the first innovation vector quantization from the first frame and from all frames after said first frame from all input channels by performing said analysis of said bitstream.

8. The decoder as ire claim 6 is further configured for reconstructing data present in said bitstream using corresponding innovation vector quantization data by performing said decoding of said bitstream data in order of significance.

* * * * *